US007523171B2

(12) United States Patent
Burckart et al.

(10) Patent No.: US 7,523,171 B2
(45) Date of Patent: Apr. 21, 2009

(54) MULTIDIMENSIONAL HASHED TREE BASED URL MATCHING ENGINE USING PROGRESSIVE HASHING

(75) Inventors: Erik John Burckart, Raleigh, NC (US); Aravind Srinivasan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1127 days.

(21) Appl. No.: 10/657,941

(22) Filed: Sep. 9, 2003

(65) Prior Publication Data

US 2005/0055437 A1    Mar. 10, 2005

(51) Int. Cl.
G06F 15/16   (2006.01)
G06F 7/00    (2006.01)
G06F 17/30   (2006.01)
G06F 17/00   (2006.01)

(52) U.S. Cl. .......................... 709/217; 707/101; 707/3
(58) Field of Classification Search ................. 709/203, 709/217, 219; 707/101, 3
See application file for complete search history.

(56) References Cited

U.S. PATENT DOCUMENTS

| 5,799,312 | A | * | 8/1998 | Rigoutsos | 707/103 R |
| 5,832,475 | A | * | 11/1998 | Agrawal et al. | 707/2 |
| 5,897,637 | A | * | 4/1999 | Guha | 707/101 |
| 6,067,547 | A | * | 5/2000 | Douceur | 707/100 |

(Continued)

FOREIGN PATENT DOCUMENTS

WO    WO 00/58871    10/2000

(Continued)

OTHER PUBLICATIONS

Nilsson et al., "IP-Address Lookup Using LC-Tries", IEEE Journal on Selected Areas in Communications, 1999, pp. 1083-1092 (12 pages).

(Continued)

Primary Examiner—Salad Abdullahi
Assistant Examiner—Philip J Chea
(74) Attorney, Agent, or Firm—Yee & Associates, P.C.; Martin J. McKinley

(57) ABSTRACT

A mechanism by which URLs are progressively hashed character by character and clauses of the URL are used to traverse a tree data structure for matching of the URL to resources/rules is provided. The hash code for a single character is appended to a prior hash code for a preceding character in the URL portion. At the time that the entire portion of the URL is hashed, as determined based on the presence of a delimiter character, the particular node in a tree data structure associated with the resulting hash code is identifiable within a hash table of a current node of the tree data structure. Each node in the tree data structure includes a multidimensional hash table for a portion of a URL. The multidimensional hash table is established and grown in a manner that ensures there are no hash collisions. Each portion of the URL is parsed in this manner and the tree data structure is traversed as each portion is processed until the entire URL is parsed at which time the resulting rules/resources may be identified from the leaf nodes of the tree data structure.

18 Claims, 4 Drawing Sheets

U.S. PATENT DOCUMENTS

| | | | |
|---|---|---|---|
| 6,581,068 B1 * | 6/2003 | Bensoussan et al. | 707/104.1 |
| 6,601,062 B1 * | 7/2003 | Deshpande et al. | 707/3 |
| 6,738,762 B1 * | 5/2004 | Chen et al. | 707/3 |
| 7,146,429 B2 * | 12/2006 | Michel | 709/238 |
| 2002/0010709 A1 | 1/2002 | Culbert et al. | 707/500 |
| 2002/0133570 A1 | 9/2002 | Michel | 709/219 |
| 2002/0143984 A1 | 10/2002 | Michel | 709/238 |
| 2002/0169889 A1 | 11/2002 | Yang et al. | 709/244 |
| 2002/0199014 A1 | 12/2002 | Yang et al. | 709/238 |
| 2003/0093517 A1 * | 5/2003 | Tarquini | 709/224 |

FOREIGN PATENT DOCUMENTS

| | | |
|---|---|---|
| WO | WO 01/93106 | 12/2001 |

OTHER PUBLICATIONS

Michel et al., "URL Forwarding and Compression in Adaptive Web Caching", IEEE Infocom 2000, Nineteenth Annual Joint Conference of the IEEE Computer and Communications Societies. Proceedings. IEEE, vol. 2, 2000, pp. 670-678.

* cited by examiner

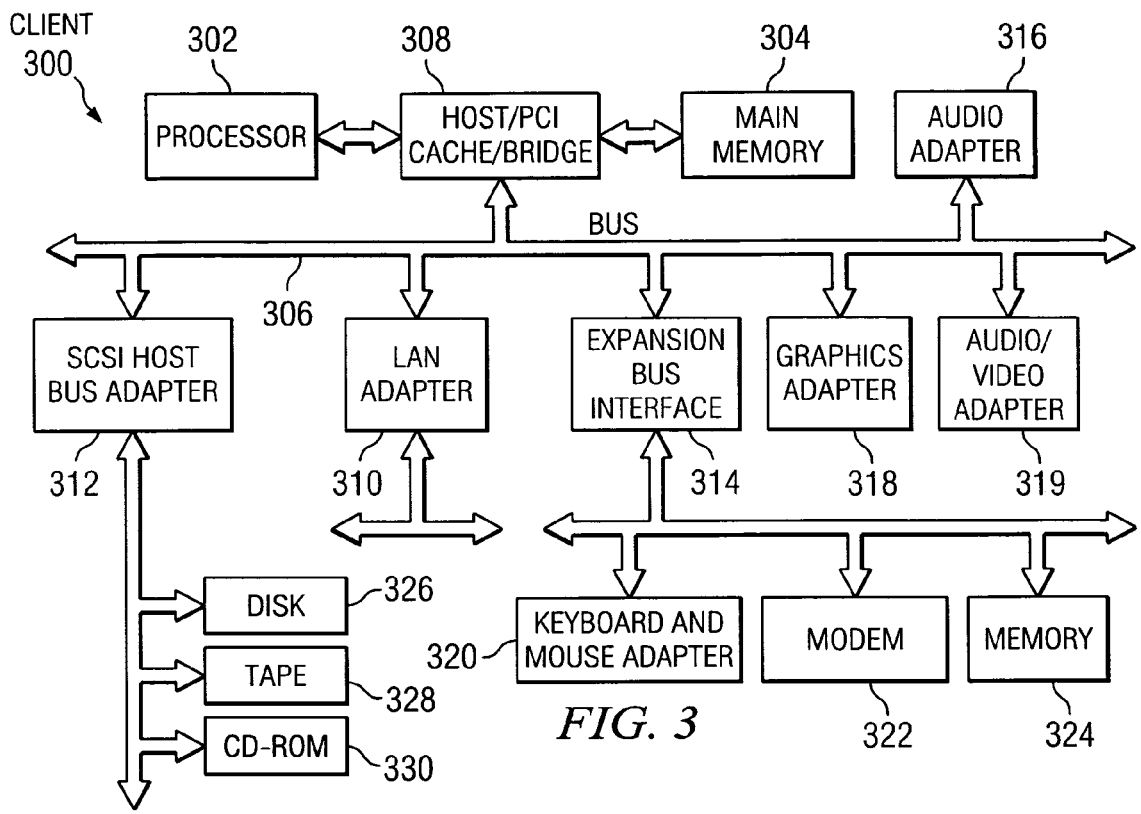
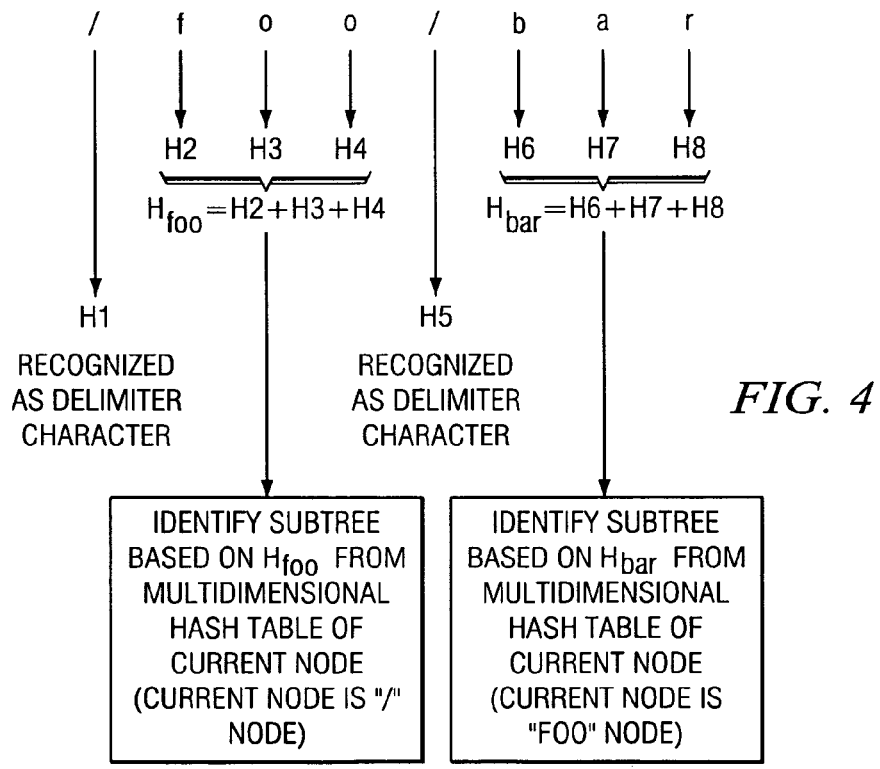

MULTIDIMENSIONAL HASHED TREE BASED URL MATCHING ENGINE USING PROGRESSIVE HASHING

BACKGROUND OF THE INVENTION

1. Technical Field

The present invention is directed to a mechanism for parsing and matching a uniform resource locator to a rule or resource. More specifically, the present invention is directed to a mechanism for progressively generating a hash of portions of a uniform resource locator and then identifying the hash of the portions within a multidimensional hash table to thereby match the uniform resource locator to a rule or resource.

2. Description of Related Art

Matching of a uniform resource locator (URL) to rules or resources is a fundamental operation performed by server-side components that process URLs. Common URL rule matching applications include the Servlet/Java Server Page (JSP) engine, URL Authenticators, and the like.

Typically, to match a URL to a resource, the URL is decomposed into constituent parts including a scheme portion, a web server name portions, a path portion, and a type portion. For example, the URL http://www.ibm.com/page1.html includes a scheme portion that is "http", the server name portions would be "com", "ibm" and "www", the path portion would be "page1" and the type portion would be "html". A decomposition tree structure is used to identify the files associated with a URL based on traversing the tree structure using the various components of the URL. Each component of the URL is hashed and its hash code appended to a prior component of the URL to obtain an accumulated URL hash code. Once the final hash code is determined by accumulating the hash codes for the components of the URL, a hash table lookup is performed to identify the files or resources associated with the URL. An example of such a system as described above is provided in U.S. Patent Application Publication No. 2002/0133570 which is hereby incorporated by reference.

It would be beneficial to have an apparatus and method for matching a URL to rules and/or resources that provides increased performance over these known techniques.

SUMMARY OF THE INVENTION

The present invention provides a mechanism by which URLs are progressively hashed character by character and clauses of the URL are used to traverse a tree data structure for matching of the URL to resources/rules. The hash code for a single character is appended to a prior hash code for a preceding character in the URL portion. At the time that the entire portion of the URL is hashed, as determined based on the presence of a delimiter character, the particular node in a tree data structure associated with the resulting hash code is identifiable within a hash table of a current node of the tree data structure. Each node in the tree data structure includes a multidimensional hash table for a portion of a URL.

The multidimensional hash table is established and grown in a manner that ensures there are no hash collisions at each node. Each portion of the URL is parsed in this manner and the tree data structure is traversed as each portion is processed until the entire URL is parsed at which time the resulting rules/resources may be identified from the leaf nodes of the tree data structure.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary block diagram of a client computing device from which a URL request may be received by the server computing device;

FIG. 4 is an exemplary block diagram illustrating progressive hashing of portions of a URL in accordance with an exemplary embodiment of the present invention;

DETAILED DESCRIPTION OF THE PREFERRED EMBODIMENT

The present invention provides a mechanism for matching uniform resource locators (URLs) to resources and/or rules. The present invention is especially well suited for use with server computing devices in a distributed data processing system. For example, a client computing device may submit a URL to a server computing device which then matches that URL to a resource/rule to perform a subsequent function. Thus, in order to provide a context for the following description of the preferred embodiments of the present invention, a brief description of a distributed data processing system will be provided with reference to FIGS. 1-3.

Figure 1:
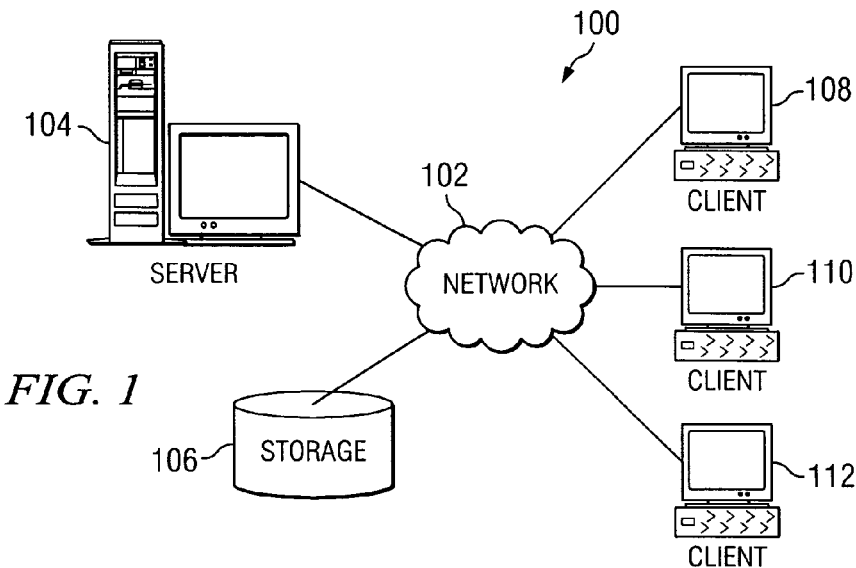
FIG. 1 is an exemplary block diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
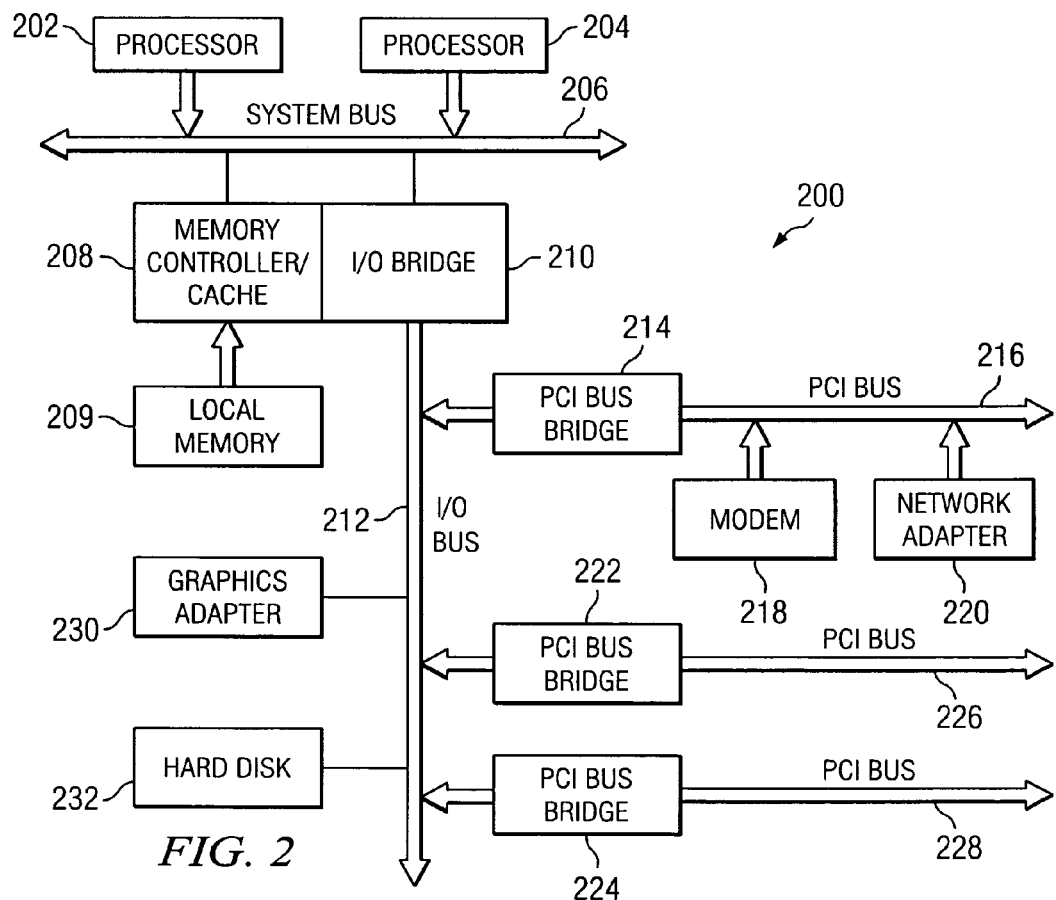
FIG. 2 is an exemplary block diagram of a server computing device in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention provides a mechanism for matching URLs to resources/rules. The present invention uses a progressive hash of portions of the URL to determine how to traverse a tree data structure to arrive at leaf nodes representing the resources/rules associated with the URL.

The tree data structure used by the present invention is a modification of known Dictionary or Digital Tree data structures that is modified for use with URLs. In the known Dictionary or Digital Tree data structure, an n-ary tree representation of a string is provided in which every node of the tree data structure represents a single character. Each node of the tree data structure has an array of subtrees indexed by the ASCII value of the next character. Thus, as a string is traversed one character at a time, the tree is traversed using the ASCII value of that character. Upon reaching the end of the string, the terminal node is examined for "targets" and those targets are returned as a successful match. If at any stage the tree traversal fails, i.e. there is no subtree corresponding to the ASCII value of the next character, the result is that there are no matching targets for the given string.

The present invention makes use of a modified form of the Dictionary or Digital Tree data structure that is modified for use with URLs. With the tree data structure of the present invention, each tree node represents a portion of the URL, i.e. a clause. A clause or portion of the URL is defined as a segment of the URL that is delimited by a particular character, e.g., "/". Thus, for example, with the URL /www.ibm.com/welcome/page1.html the clauses or portions are www.ibm.com, welcome, and page1.html.

Each node of the tree data structure includes a multidimensional hash table for identifying subtrees of the tree data structure. In a preferred embodiment, the multidimensional hash table is a three dimensional table in which each entry of the table has an X, Y and Z coordinate in the table. For example, the target object in the multidimensional hash table is identified using the following equation:

$$T_h \Leftrightarrow \{(h \% X), (h \% Y), (h \% Z)\} \quad (1)$$

where $T_h$ is the target object entry, e.g., the subtree root node, h is the hash code of the clause or portion of the URL, X, Y and Z are the dimensions of the three dimensional hash table, and % is the modulo operator. The three dimensional hash table is grown such that there are no collisions between hashed values. That is, when a put( ) method is called to place an entry into the hash table for a node of the tree data structure, the multidimensional hash table is restructured with new dimensions that eliminate any possibility of a hash collision.

For example, if the dimensions of the multidimensional hash table are x=1, y=2, z=3 and a new entry is to be placed in the hash table, the coordinates for where it will be placed in the table are first computed using equation (1) above. If the resulting space is empty, the new entry is added without any change to the table dimensions. If there was already a subtree at the computed location, the hash table is grown by iteratively adjusting the dimensions, such that all the elements of the table are in unique locations in the table as prescribed by equation (1). The resulting table may end up, for example, with dimensions x=4, y=2, z=3 The next addition to the hash table may result in the dimensions being x=4, y=5, z=3 followed by the next addition resulting in dimensions x=4, y=5, z=6, and so on. In this way, hash collisions are avoided.

Hash collisions often decrease performance in hash table implementations. In the above example, where x=1, y=2, z=3, a collision would occur if one hash value (h in the above formula) would be equal to 6 for one word and 12 for another word. This is because h % x=0, h % y=0, and h % z=0 for both h=6 and h=12. When growing the table, setting x=4, y=2, x=3, for h=6, h % x=2, h % y=0, and h % z=0. However, for h=12, h % x=0, h % y=0, and h % z=0. This puts the two items in different locations in the table.

Another important piece to this algorithm is that we increment each dimension by the number of dimensions. This is important because, in the above example, there would be no gain by increasing the size of x by 1 because the two words collide in another space already set to that number.

Thus, by ensuring that no hash collisions occur on a put( ), the time required to get( ) the target/rule is always constant irrespective of the size of the table, which is a certain advantage over traditional bucket based hashing strategies, where get( ) times are not always constant.

While the above embodiment is described in terms of a three dimensional hash table, the present invention is not limited to such. Rather, any multidimensional hash table may be utilized without departing from the spirit and scope of the present invention. For example, a four dimensional hash table may be utilized, in which case, each entry in the table will be characterized by 4 coordinates and equation (1) will be adjusted to accommodate the fourth dimension, while the same strategies are employed to ensure that hash collisions are eliminated and get( ) times are constant. In short, the dimensions of the hash table are grown by an amount equal to the number of dimensions of the hash table.

Since the hash table is grown in such a manner that hash collisions are not possible, there is no need for a rehash strategy in the operation of the present invention. This greatly increases the speed at which URL matching may be performed since cycles are not wasted on handling hash collisions and performing rehashes to correct for the hash collisions. In addition, the need to traverse a list of possible matches, such as in the case with traditional bucket based hashing strategies, for the resolution of a given URL on a get( ) call is eliminated.

Thus, given a hash code for a clause or portion of a URL, a target subtree of a tree data structure may be found by inserting the hash code as h and the dimensions of the multidimensional hash table, which in this case are X, Y and Z, in equation (1). The entry in the multidimensional hash table corresponding to the resulting target value $T_h$ is then retrieved and used to identify the subtree to which the traversal of the tree data structure should proceed.

The process is then repeated for each subsequent clause or portion of the URL until the entire URL is processed or there is no matching subtree for a calculated $T_h$ value, i.e. the URL does not match to any resources/rules. Once the URL is processed completely in this manner, the terminal node is searched for any target resources/rules and these resources/rules are returned as matches for the URL. Each node on the tree has the ability to store a reference to an object or identifier of a rule or resource. If there is not an identifier set in this target node, then the resource is assumed not to exist. When composing the tree, the target identifiers are set in the last node, i.e., the leaf nodes, of the URL added.

In order to obtain the hash code for a clause or portion of a URL, the present invention makes use of a progressive hashing mechanism that parses and hashes each character in the URL while identifying clauses or portions of the URL and traversing the tree data structure in virtually a parallel operation. With the present invention, when a URL is to be matched to a resource/rule, the URL is received and a hash code for a current clause/portion of the URL is initialized to a starting value. The next character in the URL is then identified and a hash of the character is generated based on a hashing algorithm. Hashing algorithms are generally known in the art and any known or later developed hashing algorithm may be used without departing from the spirit and scope of the present invention.

Once the hash for the character is generated, the hash code is compared to at least one hash code corresponding to a delimiter, or "special", character. While the preferred embodiments are described as utilizing the "/" character as a delimiting character, the present invention is not limited to such. Rather, any character may be designated as a delimiting character without departing from the spirit and scope of the present invention. Moreover, more than one "special" character may be defined in the mechanism of the present invention with functions or nodes of the tree data structure being established for these "special" characters. A "special" character is one that is set apart from other characters as having a designated functionality associated with it. In the exemplary embodiments, the "/" character is special in that it is designated as having the function of separating clauses or portions of a URL.

If the hash of the character in the URL results in the hash code not matching a hash code of a special character, then the hash code for the character is added to the hash code for the current clause or portion of the URL and the process is repeated for the next character in the URL. If the hash of the character in the URL results in the hash code matching a hash code for a special character, which in the preferred embodiments is a delimiting character, then it is determined that the end of the clause or portion of the URL has been encountered.

When the end of the clause or portion of the URL is identified, the hash code for the clause or portion has already been compiled. As a result, the present invention may use the compiled hash code for the current clause or portion of the URL to calculate $T_h$ and retrieve the identity of the subtree associated with the clause or portion of the URL that was progressively hashed. The traversal of the tree data structure may be performed by designating the current node to be the root node of the subtree identified by the target value $T_h$ in the multidimensional hash table of the previous node in the tree data structure. This process may be repeated for each subsequent clause/portion of the URL until the entire URL is processed or until a subtree corresponding to a clause in the URL cannot be identified, i.e. there are no resources/rules associated with the URL.

Once the URL is completely processed in the above manner, the terminal node, i.e. the current node for the last clause/portion of the URL, is searched for targets. That is, the resources/rules associated with the terminal node in the tree data structure are identified and returned as matched resources/rules associated with the URL. The server may then perform appropriate processing based on the identified resources/rules.

Because the present invention makes use of progressive hashing and incremental traversal of the tree data structure with each hashed clause/portion of the URL, the traversal of the tree data structure and the progressive hashing may be performed virtually in parallel. This greatly increases the speed at which the mechanisms of the present invention match URLs to resources/rules when compared to existing methods of performing URL matching.

FIG. 4 is an exemplary block diagram illustrating progressive hashing of portions of a URL in accordance with an exemplary embodiment of the present invention. As shown in FIG. 4, a portion of a URL "/foo/bar" is illustrated. The present invention hashes each character of the URL individually and then determines whether to added the hash code for the character to a hash code for a clause or portion of the URL, or whether the hash code for the character indicates the character to be a "special" character.

For example, as shown in FIG. 4, during parsing of the URL, the first character "/" is evaluated to correspond to a special delimiter character and thus, the present invention would perform a lookup of any hash code for a prior portion of the URL in a multidimensional hash table of the current node of the tree data structure.

Since a special character was encountered, the present invention would reinitialize the hash code for a current URL clause to a starting value and then continue to parse the URL to identify the hash code of the next clause in the URL. The continued parsing of the URL results in the character "f" being hashed to a hash code of H2. Since H2 does not correspond to a special character, H2 is added to the hash code for $H_{foo}$. This process is then repeated for each of characters "o" in "foo" resulting in hash codes H3 and H4 which are both added to the hash code $H_{foo}$. When the next character "/" is evaluated, it is realized, before hashing the "/", that this is the special delimiter character. Thus, the hash code Hfoo is then used to calculate Th using the dimensions for the multidimensional hash table of the current node of the tree data structure. The Th value is then looked up in the multidimensional hash table to thereby identify the subtree to which traversal of the tree data structure should proceed.

The root node for this subtree is then set as the current node and the operation continues with the parsing and hashing of the clause "bar". The hash code $H_{bar}$ is generated as the combination of the hash codes H6, H7 and H8 for the characters of this clause in the URL and is then used to calculate $T_h$, based on the dimensions for the multidimensional hash table for the current node, i.e. the "foo" node, for this clause. The resulting value for $T_h$ is then used to identify the subtree corresponding to this clause. Since this is the last clause in the URL, the node corresponding to "bar" would be searched for targets and the targets returned as matches for the URL "/foo/bar".

Figure 5:
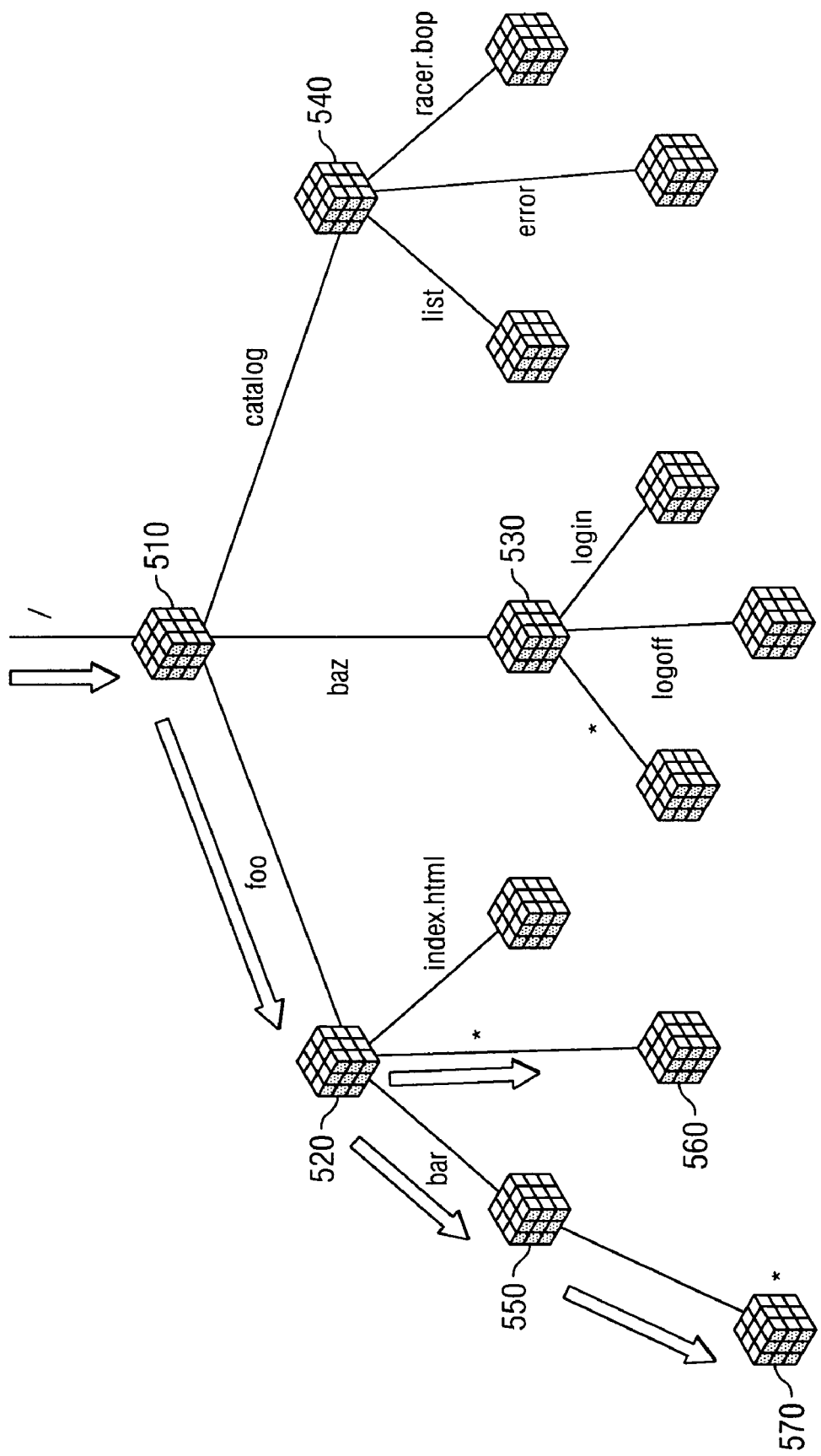
FIG. 5 is an exemplary block diagram illustrating traversal of a tree data structure in accordance with the present invention.

FIG. 5 is an exemplary block diagram illustrating traversal of a tree data structure in accordance with the present invention. As shown in FIG. 5, the tree data structure includes a plurality of nodes (represented by cubes denoting the multidimensional hash tables associated with the nodes). The transition from one node to the next is illustrated by a line with an associated URL clause or portion. For example, as shown in FIG. 5, entries in the multidimensional hash table of node 510 identify nodes 520, 530 and 540. A hash code corresponding to the URL clause "foo" results in the transition from node 510 to node 520 being the current node. A subsequent hash code corresponding to the URL clause "bar" results in the current node being reassigned to node 550, and so on.

In one preferred embodiment of the present invention, in addition to determining the next clause in the URL, getting its hash code by progressive hashing of characters, and getting the target subtree for the clause from the hash table of the current node, the present invention checks the current node for any wildcard matches. For example, if there are any child nodes of the current node that are associated with a wildcard character, which is a form of special character, such as "*", then the targets associated with this wildcard node are added to a list of matching resources/rules for the URL.

Thus, as shown in FIG. 5, the targets associated with node 560 are added to the list of matched resources/rules. In addition, since "bar" is the last clause of the URL, the resources/rules associated with the node 570 are also included in the list of matched resources/rules.

As an example of how to traverse the tree data structure shown in FIG. 5, the following description is provided with reference to the exemplary URL "/foo/bar/defaultPage." A first step in retrieving matched resources/rules for "/foo/bar/defaultPage involves initializing the current node to be the "/" node 510. The first clause is then progressively hashed as previously described above. The subtree for the clause "foo" is then requested from the current node and the current node is checked for any child wildcard nodes. Since no wildcard nodes are found, the list of matched results is not modified.

The subtree for "foo" is found and the current node is reset to the root node of the subtree for "foo", i.e. node 520. The next clause "bar" is parsed and progressively hashed. The subtree for "bar" is requested from the current node, i.e. the "foo" node. In addition, the "foo" node is checked for any child wildcard nodes.

Since the "foo" node has a wildcard child node 560, the targets associated with the wildcard child node 560 are added to the list of matched resources/rules.

The subtree for "bar" is found in the hash table for the current node and the current node is reset to the root node of the subtree for "bar", i.e. node 550. The next clause "default- Page" in the URL is parsed and progressively hashed. The subtree for "defaultPage" is requested from the current node, i.e. node 550, and the current node is checked for any child wildcard nodes. Since the node 550 has a child wildcard node 570, the targets associated with node 570 are added to the list of matched resources/rules.

However, no subtree is found for the clause "defaultPage." The extension for "defaultPage" is determined to be null and thus, extension matching is ignored. An extension is an identification of a "type" element of a URL as discussed previously. Rules or resources provided to the present invention may be keyed to a particular URL "type" element, such as "html." Thus, for example, the rules associated with the present invention may include a rule corresponding to the pattern *.html. In such a case, in addition to identifying all the path matches for the input URL using the present invention, the extension of the input URL may also be examined to see if it matches any predefined extension patterns. If it does, the corresponding target may also be included in the list of targets matched for the input URL.

For example, if the input URL were /foo/bar/defaultPage.html, and there was a predefined target/rule T1 defined for *.html, then, in addition to returning the rules associated with /foo/* and /foo/bar/* the present invention may also return the target/rule T1 since it matches the extension rule *.html. The pattern-rule entries may be maintained in a separate table, and the check may be performed following the completion of the tree traversal for the input URL.

Returning to FIG. 5, since the match list is not empty, the results of the URL matching will be returned to the application that requested the URL matching. The results would include the resources/rules associated with /foo/* and /foo/bar/*.

Figure 6:
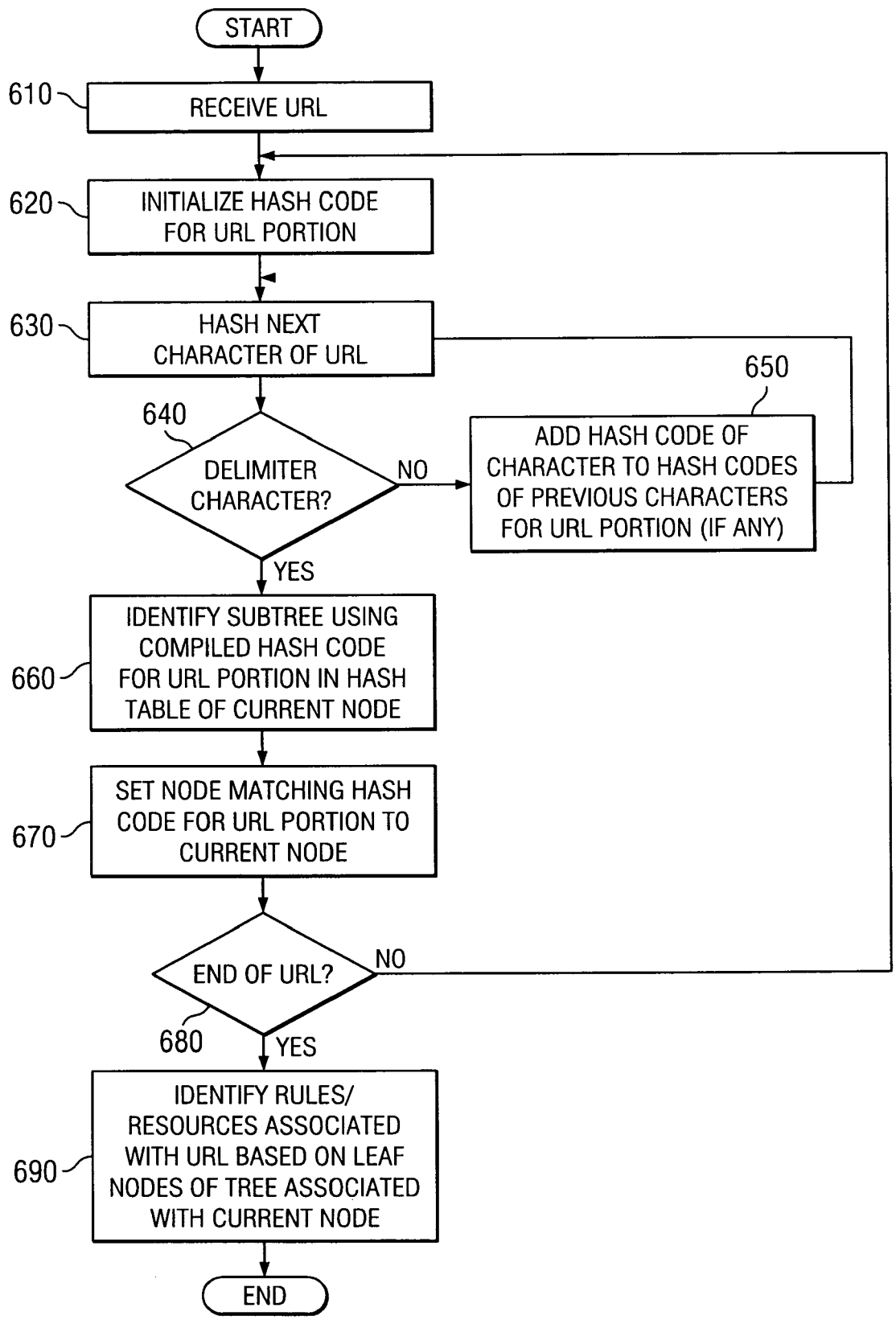
FIG. 6 is a flowchart outlining an exemplary operation of the present invention.

FIG. 6 is a flowchart outlining an exemplary operation of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 6, the operation starts by receiving a URL for which associated resources/rules are to be identified (step 610). The hash code for the current portion of the URL is initialized to a starting state (step 620). The next character in the URL is then hashed to obtain a hash code for that individual character (step 630). A determination is made as to whether the hash code identifies a delimiter character, e.g., a "/" character (step 640). If not, the hash code for the individual character is then added to any previously compiled hash code for the URL portion if any (step 650). The process then continues by returning to step 630 where the next character in the URL is hashed.

If the hash code of the character indicates that the character is a delimiter character, such as "/", then the compiled hash code for the URL portion is used to identify a corresponding subtree within the tree data structure by looking up the hash code in the multidimensional hash table associated with the current node of the tree data structure (step 660). The root node for the subtree is then set as the current node (step 670) and a determination is made as to whether the end of the URL has been encountered (step 680). If not, the operation returns to step 620. Otherwise, if the end of the URL has been encountered, then the rules/resources associated with the URL are identified as the leaf nodes associated with the current node (step 690). The operation then terminates.

Thus, the present invention provides a mechanism that utilizes progressive hashing of characters in a URL to traverse a tree data structure. As each portion of the URL is progressively hashed, the resulting hash code for the URL portion is used to perform a lookup in a multidimensional hash table associated with the current node of the tree data structure. In this way, a fast and easily used URL matching mechanism is provided for matching URLs to resources and/or rules in server computing devices is provided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of matching a Uniform Resource Locator (URL) to a resource or rule, comprising:
   progressively hashing a clause of the URL, character by character, individually, to generate a hash code associated with the clause;
   determining if a delimiting character is encountered;
   using the hash code associated with the clause to traverse a tree data structure representing clauses of URLs and corresponding resources or rules, wherein each node of the tree data structure has an associated multidimensional hash table, wherein using the hash code includes calculating a target value based on the hash code and dimensions of a multidimensional hash table associated with a current node in the tree data structure; and matching the URL to resources or rules based on the traversing of the tree data structure.

2. The method of claim 1, wherein using the hash code further includes using the target value to identify an entry in the multidimensional hash table corresponding to a subtree associated with the clause.

3. The method of claim 2, wherein traversing the tree data structure includes setting the current node of the tree data structure to be a root node of the subtree associated with the clause.

4. The method of claim 1, wherein entries for subtrees in the multidimensional hash table are positioned in the multidimensional hash table using the equation:

$$Th\ y\{(h\ \%\ X), (h\ \%\ Y), (h\ \%\ Z)\ \}$$

wherein Th is a target object in the multidimensional hash table, h is a hash value for a root node of a subtree, and X, Y and Z are dimensions of the multidimensional hash table.

5. The method of claim 1, wherein the multidimensional hash table is created by growing the multidimensional hash table such that hash collisions are avoided.

6. The method of claim 5, wherein the multidimensional hash table is grown by a total number of dimensions for the multidimensional.

7. The method of claim 3, further comprising:
searching the current node for target resources or rules; and
adding any target resources or rules to a list of matched resources or rules.

8. The method of claim 3, further comprising:
determining if there are any child nodes of the current node corresponding to a "wildcard" node and
adding any target resources or rules associated with the "wildcard" node to a list of matched resources or rules.

9. The method of claim 1, further comprising:
returning a list of matched resources or rules to a calling application.

10. A computer program product for matching a Uniform Resource Locator (URL) to a resource or rule, the computer program product comprising:
a computer readable storage medium comprising computer readable instructions, the computer readable instructions comprising:
first instructions for progressively hashing a clause of the URL, character by character individually, to generate a hash code associated with the clause;
second instructions for determining if a delimiting character is encountered;
third instructions for using the hash code associated with the clause to traverse a tree data structure representing clauses of URLs and corresponding resources or rules, wherein each node of the tree data structure has an associated multidimensional hash table, wherein using the hash code includes calculating a target value based on the hash code and dimensions of a multidimensional hash table associated with a current node in the tree data structure; and
fourth instructions for matching the URL to resources or rules based on the traversing of the tree data structure.

11. The computer program product of claim 10, wherein the third instructions for using the hash code further include instructions for using the target value to identify an entry in the multidimensional hash table corresponding to a subtree associated with the clause.

12. The computer program product of claim 11, wherein the tree data structure is traversed by setting the current node of the tree data structure to be a root node of the subtree associated with the clause.

13. The computer program product of claim 10, wherein entries for subtrees in the multidimensional hash table are positioned in the multidimensional hash table using the equation:

$$Th\ y\{(h\ \%\ X), (h\ \%\ Y), (h\ \%\ Z)\ \}$$

wherein Th is a target object in the multidimensional hash table, h is a hash value for a root node of a subtree, and X, Y and Z are dimensions of the multidimensional hash table.

14. The computer program product of claim 10, wherein the multidimensional hash table is created by growing the multidimensional hash table such that hash collisions are avoided.

15. The computer program product of claim 14, wherein the multidimensional hash table is grown by a total number of dimensions for the multidimensional.

16. The computer program product of claim 12, further comprising:
fifth instructions for searching the current node for target resources or rules; and
sixth instructions for adding any target resources or rules to a list of matched resources or rules.

17. The computer program product of claim 12, further comprising:
fifth sub-instructions for determining if there are any child nodes of the current node corresponding to a "wildcard" node; and
sixth sub-instructions for adding any target resources or rules associated with the "wildcard" node to a list of matched resources or rules.

18. An apparatus for matching a Uniform Resource Locator (URL) to a resource or rule, comprising:
a bus;
a memory connected to the bus, wherein the memory comprises computer executable instructions directing the apparatus to:
progressively hash a clause of the URL, character by character individually, to generate a hash code associated with the clause;
determine if a delimiting character is encountered;
use the hash code associated with the clause to traverse a tree data structure representing clauses of URLs and corresponding resources or rules, wherein each node of the tree data structure has an associated multidimensional hash table, wherein using the hash code includes calculating a target value based on the hash code and dimensions of a multidimensional hash table associated with a current node in the tree data structure; and
match the URL to resources or rules based on the traversing of the tree data structure.

* * * * *